Figure 1:
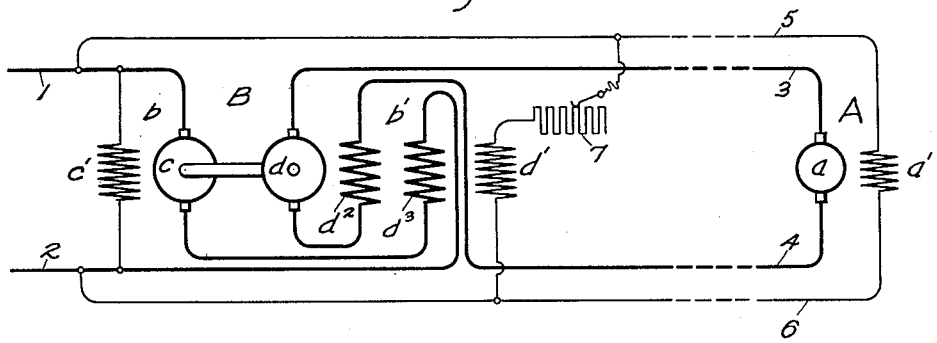

No. 898,058. PATENTED SEPT. 8, 1908.
W. L. MERRILL.
MEANS FOR REGULATING DYNAMO ELECTRIC MACHINES.
APPLICATION FILED FEB. 20, 1906.

Witnesses:
Murray D. Badgley
Helen Alford

Inventor
Wilbur L. Merrill
By Albert G. Davis
Atty.

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

MEANS FOR REGULATING DYNAMO-ELECTRIC MACHINES.

No. 898,058.          Specification of Letters Patent.          Patented Sept. 8, 1908.

Application filed February 20, 1906. Serial No. 302,031.

*To all whom it may concern:*

Be it known that I, WILBUR L. MERRILL, a citizen of the United States, residing at Schenectady, county of Schenectady, State of New York, have invented certain new and useful Improvements in Means for Regulating Dynamo-Electric Machines, of which the following is a specification.

The present invention relates to the regulation of dynamo-electric machines and more particularly generators forming part of motor-generator sets supplying current to motors.

A common method of operating and controlling electric motors consists in supplying current to the motor from a generator which is in turn driven by a motor connected to the main source of current supply. The power and speed of the motor are then controlled by varying the voltage of the generator, usually by increasing or decreasing the field excitation produced by a shunt winding. In this arrangement, for any given field excitation of the generator, the motor to be operated and controlled would run at a uniform speed irrespective of the load, except for variation in potential losses due to the resistance of the line, generator armature and motor armature, and reactions in the generator armature. These losses of course increase with the load, that is, with the current; and when, as frequently happens, the motor is removed at some considerable distance from the motor-generator, the line loss is considerable. The potential loss due to the brush and armature resistance of the motor unit is likewise of importance where a plurality of motors are operated in series, for example. In addition to these losses in potential, the potential of the generator is lowered upon increase in load by reason of the slowing down of the motor which drives the generator.

It is customary to compound the generator by providing an auxiliary series field winding which excites the field of the generator variously depending upon the current taken from the generator. If current were to be supplied by the generator at one potential only, this series winding could of course be proportioned so as to compensate for all the potential losses under different load, so as to maintain the speed of the motor uniform; but where the generator is intended to supply current varying widely in voltage, this compounding, if proper for low voltages and large currents, is insufficient for high voltages and large currents, by reason of the fact that the generator field is highly magnetized at high voltages and an increase in current in the series winding does not produce the same increase in field strength as is the case at lower voltages. Similarly, if the compounding is designed for most effective operation at high voltages the machine is over-compounded at low voltages.

The object of the present invention is to provide means, in a system of the character described, whereby the voltage at the terminals of the motor to be operated and controlled may be automatically maintained at a value adapted to keep the speed of the motor substantially uniform at any desired value within the limits determined by the range of voltage at which the generator may supply current.

To the above end I have provided the generator with a field winding which shall be energized by the current flowing through the armature of the motor which drives the generator. In this arrangement the magnetomotive force produced by this compounding winding varies directly with the load on the system and is independent of the current taken by the motor to be controlled. On the lighter loads the field excitation increases approximately in the same ratio as the magnetomotive force, but on the heavy loads, namely after saturation of the field magnets of the generator, the flux increases less rapidly than the magnetomotive force. Good compounding may be effected by utilizing the currents flowing through both motors for exciting the generator, since on light loads, and consequently with an unsaturated generator field, the potential losses may be taken care of by currents supplied by the generator, the excitation due to the current in the motor of the motor-generator set being small because the total load is small; while upon heavy loads this excitation will be augmented by that resulting from the increased magnetomotive force due to the other current. In actual practice the compounding windings are preferably so adjusted that the best results are obtained at a given low load and at a heavy load, and then a satisfactory regulation is obtained at the other loads also.

The present invention is illustrated in the accompanying drawing wherein

Figure 2:
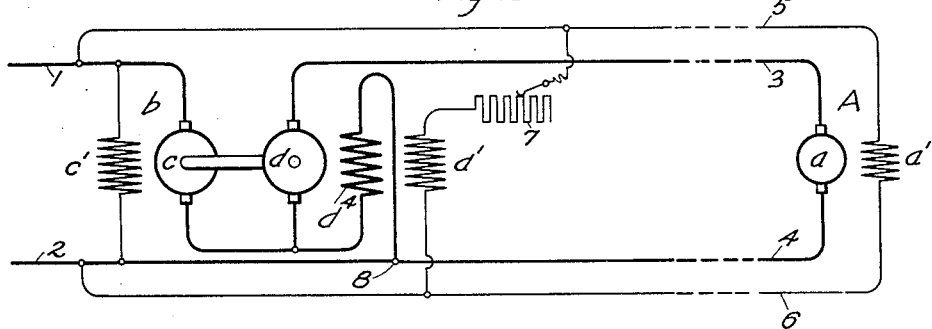

Figure 1 shows diagrammatically a motor generator system adapted to supply current to and control the speed and power of an electric motor, the whole being arranged in accordance with the present invention; and Fig. 2 is a similar view showing a further modification.

Reference being had to Fig. 1 of the drawing, A indicates an electric motor and B a motor-generator for supplying current to the motor. The motor-generator comprises a motor $b$ having an armature $c$ and field winding $c^1$, and a generator $b^1$ having an armature $d$ and field windings $d^1$, $d^2$ and $d^3$. The motor $b$ is illustrated as a shunt motor having its armature and field windings connected in parallel across the supply mains 1 and 2. The motor A is situated at some distance from the motor generator, and its armature $a$ is supplied with current from the generator through leads 3 and 4. The field winding $a^1$ may be energized by current from the supply mains through leads 5 and 6. The speed of the motor A is determined by the voltage of the generator which is controlled by adjusting the rheostat 7 in the circuit of the main field winding $d^1$, preferably connected across the supply main. If it were not for the drop in potential in the leads 3 and 4, between the terminals of the motor and generator armature, and because of the lowering of the generator speed upon increase in load; the speed of the motor would remain constant for any given setting of the rheostat 7, irrespective of the load, but this drop in potential varies directly with the current supplied by the generator. The field windings $d^2$ and $d^3$ of the generator serve to compensate for the drop in potential in the system from the various causes specified, the winding $d^2$ being in series with the armatures $a$ and $d$ and the winding $d^3$ being in series with the armature of the motor driving the generator. When the generator is adjusted to give current at a low voltage, the generator field does not become highly magnetized and therefore, by properly proportioning the windings $d^2$ and $d^3$, the auxiliary field excitation of the generator varies directly with the load; and, as the line drop increases upon increase in current supplied by the generator, the voltage of the generator is gradually increased so as to maintain a constant potential between the terminals of the armature of the motor A,—the effect of the winding $d^3$ being relatively small. When the generator is delivering current at a high potential, the line drop between it and the motor varies exactly as before, directly as the current varies. If the load on the system is heavy, the current taken by the motor $b$ is proportionately greater than on lower loads, and the effect of the winding $d^3$ is increased, keeping pace with the increased reluctance of the magnetic circuit of the generator due to saturation in a manner not possible by the winding $d^2$. In this way the load factor and the factor depending simply upon the current delivered by the generator at all times coöperate to provide a uniform increase of potential as the current increases, notwithstanding the difference in the reluctance of the magnetic circuit of the generator under different conditions.

In Fig. 2 the motor $b$ of the motor-generator set is the same as in Fig. 1, but instead of having two regulating windings on the generator, a single winding $d^4$ is employed; this single winding being in series with both the generator armature $d$, and the motor armature $c$. The currents flowing through these two armatures, after passing through the winding $d^4$, branch at the point 3, one flowing through the armature of the motor A, and the other through the main supply circuit.

Although but two modifications of the present invention have been illustrated, I do not desire to limit the present invention to these two modifications alone, since it is evident that the regulation of the generator of the motor-generator set by means dependent upon the load on the motor may be carried out in other ways than those illustrated.

What I claim as new and desire to secure by Letters Patent of the United States, is,—

1. In a system of control, an electric motor, a motor generator set supplying current to said motor, means for varying the voltage of the generator of the motor generator set to vary the speed of said motor, and means for modifying the voltage of said generator so as to maintain a predetermined speed of said motor constant, independent of its load.

2. In a system of control, a source of current supply, a shunt motor with its field excited from said supply, a motor set driven from said current supply supplying current to the armature of said motor, the generator of said motor generator set having a field winding with a variable resistance arranged to vary its voltage through wide limits, a second winding in series with its armature circuit and a third winding in series with its driving motor armature for maintaining a substantially constant voltage on the generator when running at high or low voltage so as to maintain a speed on the motor independent of its load, all the windings producing a flux in the same direction.

In witness whereof, I have hereunto set my hand this 19th day of February, 1906.

WILBUR L. MERRILL.

Witnesses:
 BENJAMIN B. HULL,
 HELEN ORFORD.